(12) United States Patent
Schomann

(10) Patent No.: US 9,733,496 B2
(45) Date of Patent: Aug. 15, 2017

(54) HANDY SHADES

(71) Applicant: Mark Schomann, Jupiter, FL (US)

(72) Inventor: Mark Schomann, Jupiter, FL (US)

( * ) Notice: Subject to any disclaimer, the term of this patent is extended or adjusted under 35 U.S.C. 154(b) by 0 days.

(21) Appl. No.: 15/055,216

(22) Filed: Feb. 26, 2016

(65) Prior Publication Data
US 2016/0252750 A1    Sep. 1, 2016

Related U.S. Application Data

(60) Provisional application No. 62/126,253, filed on Feb. 27, 2015.

(51) Int. Cl.
G02C 1/00 (2006.01)
G02C 11/00 (2006.01)
G02C 5/22 (2006.01)

(52) U.S. Cl.
CPC ............ *G02C 11/00* (2013.01); *G02C 5/22* (2013.01)

(58) Field of Classification Search
CPC .......... G02C 5/143; G02C 3/04; G02C 11/02

USPC ....... 351/158, 41, 121, 111; 215/400; 7/170, 7/169, 128, 151, 158; 362/119, 800; D8/34

See application file for complete search history.

(56) References Cited

U.S. PATENT DOCUMENTS

| | | | |
|---|---|---|---|
| 6,185,772 B1 | 2/2001 | Bates | |
| 7,237,292 B1 | 7/2007 | Endres | |
| 7,367,670 B2 * | 5/2008 | Duane | G02C 5/143 351/121 |
| 7,380,349 B2 | 6/2008 | Ritter et al. | |
| 2008/0239235 A1 * | 10/2008 | Severino | G02C 5/143 351/158 |
| 2009/0096984 A1 * | 4/2009 | Ianelli | G02C 5/143 351/158 |

* cited by examiner

*Primary Examiner* — Hung Dang
(74) *Attorney, Agent, or Firm* — Morrison & Foerster LLP

(57) ABSTRACT

An eyeglass frame including a center portion configured to hold two lenses, a temple member connected to the center portion with a hinge, and a tab connected to the temple member configured to fit underneath the lip of a bottle cap and remove the bottle cap.

10 Claims, 17 Drawing Sheets

HANDY SHADES

CROSS-REFERENCE TO RELATED APPLICATIONS

This application claims the benefit of U.S. provisional application No. 62/126,253, filed on Feb. 27, 2015 by inventor Mark Schomann, entitled "Handy Shades."

FIELD OF THE INVENTION

The present disclosure relates generally to wearable bottle openers, and more specifically to eyeglass frames with a built-in bottle opener.

BACKGROUND OF THE INVENTION

Bottle openers were developed to open a variety of bottles, including those with caps that are crimped to seal in the contents, whether it be beer, soda, or other liquids. Openers are available in many different designs, including hand held, wall mounted, vending machine mounted, as well as other styles.

Hand held bottle openers are useful because they may be carried by a person and used when the need arises, like at a party or outdoors. However, hand held bottle openers may be inconvenient because they can be bulky or otherwise difficult to carry, especially when a user lacks pockets, and the user must remember to carry one with them. Many people carrying sunglasses with them, for example, to parties or other outdoor events with bottles, and may have trouble finding a place to carry both sunglasses and a hand held bottle opener. Wearable bottle openers have been developed to address these inconveniences. Different types and styles of wearable bottle openers exist, including a few bottle openers that are incorporated into belt buckles, including U.S. Pat. Nos. 6,185,772 and 7,237,292, and bottle openers that are incorporated into footwear, including U.S. Pat. No. 7,380,349.

Belt buckle bottle openers may be difficult to use, as they twist, or rotate the belt, with the opener detail being positioned at belt level, and they are generally conspicuous, which may be undesirable to a user. Bottle openers incorporated into footwear require a user to remove the footwear in order to use and may expose a bottle to the underside of the footwear. This may be inconvenient and unsanitary. Accordingly, there is a need for a wearable bottle opener that is inconspicuous and easy to use.

BRIEF SUMMARY OF THE INVENTION

A pair of sunglasses with a built-in bottle opener that is inconspicuous and easy to use. The bottle opener may be incorporated into one or more temples of the sunglasses. According to certain embodiments, the bottle opener includes a tab that may retract into a temple of the sunglasses such that it may be substantially hidden. According to certain embodiments, the sunglasses include a brace that extends from the back of the frame of the sunglasses at the point of attachment between the frame and the temple. A bottle cap may be removed from a bottle by folding the temple toward the frame in a conventional sunglass storage configuration, positioning the tab underneath the bottle cap, resting the top of the bottle cap against the brace, and applying a prying force.

According to certain embodiments, an eyeglass frame including a center portion configured to hold two lenses, a temple member connected to the center portion with a hinge, and a tab connected to the temple member configured to fit underneath the lip of a bottle cap and remove the bottle cap.

In any of the embodiments, the tab may include a protruding portion protruding from a side of the temple member, the protruding portion including an extension that extends toward an end of the temple member connected to the center portion such that a gap is formed between the extension and the side of the temple member.

In any of the embodiments, the tab may be rigidly connected to the temple member. In any of the embodiments, the tab may be connected to the temple member by the hinge and is configured to extend through the temple member when in use.

In any of the embodiments, the center portion may include a brace extending from the back of the center portion and configured to contact the top of the bottle cap while the tab fits underneath the lip of the bottle cap.

In any of the embodiments, the center portion and the temple member may be formed of plastic and the tab and the brace may be formed of metal.

In any of the embodiments, an eyeglass frame may further include a brace connected to the temple member, the brace configured to contact the top of the bottle cap while the tab fits underneath the lip of the bottle cap.

In any of the embodiments, the temple member may include a slot into which the tab recesses when not in use. In any of the embodiments, the temple member may include a spring configured to retract the tab into the recess when not in use. In any of the embodiments, the tab may include a spring configured to retract the tab into the recess when not in use.

DETAILED DESCRIPTION OF THE INVENTION

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

Embodiments of eyeglasses with bottle opening features integrated into the frame are described herein. According to certain embodiments, the bottle opening features may be inconspicuously integrated into the frame, and the bottle opening functionality of the sunglasses may be easy to use. The described embodiments allow a user to always have a bottle opener handy whenever they have their eyeglasses. A user does not have to carry around a bulky bottle opener and does not have to worry about remembering to carry a bottle opener.

Although reference is made to eyeglasses, it is to be understood that the term eyeglasses is used for descriptive purposes only and is not intended to be limiting. Embodiments may include sunglasses, prescription glasses to correct for vision, reading glasses, ski goggles, safety glasses or goggles, stylistic eyeglasses, and other types of eyewear.

Figure 7:
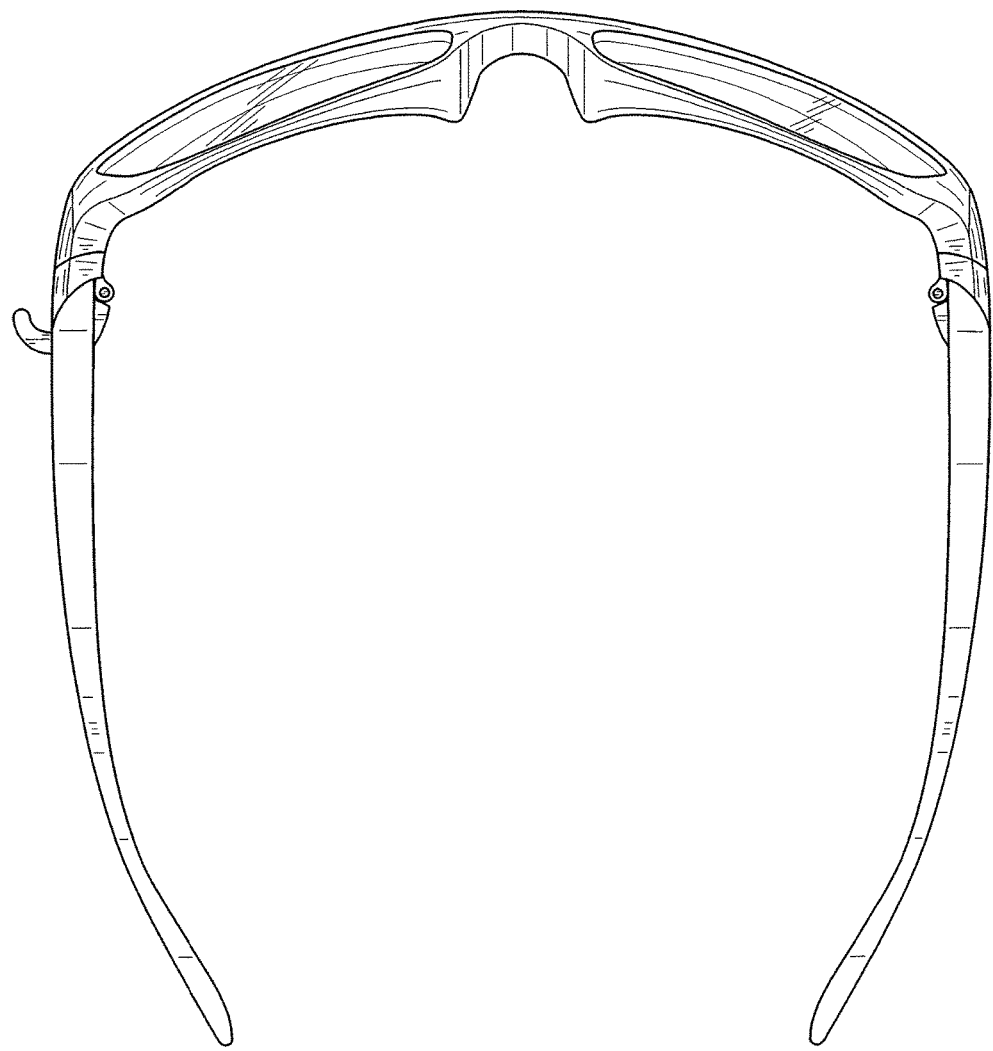
FIG. 7 is a bottom view showing the bottle opener extended according to certain embodiments.
Figure 8:
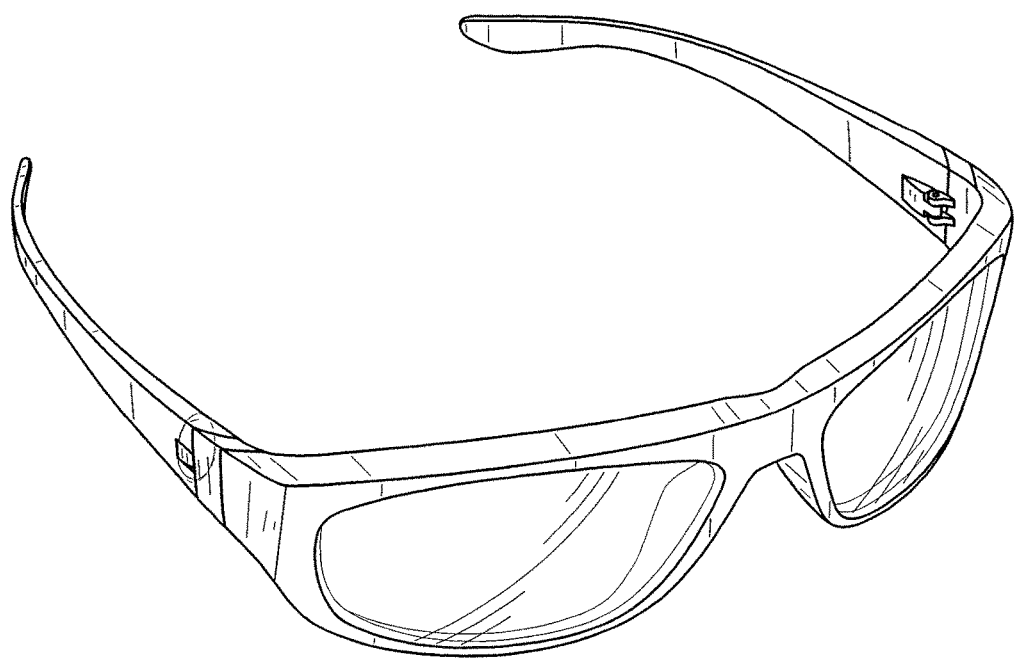
FIG. 8 is a perspective view showing the bottle opener retracted according to certain embodiments.
Figure 9:
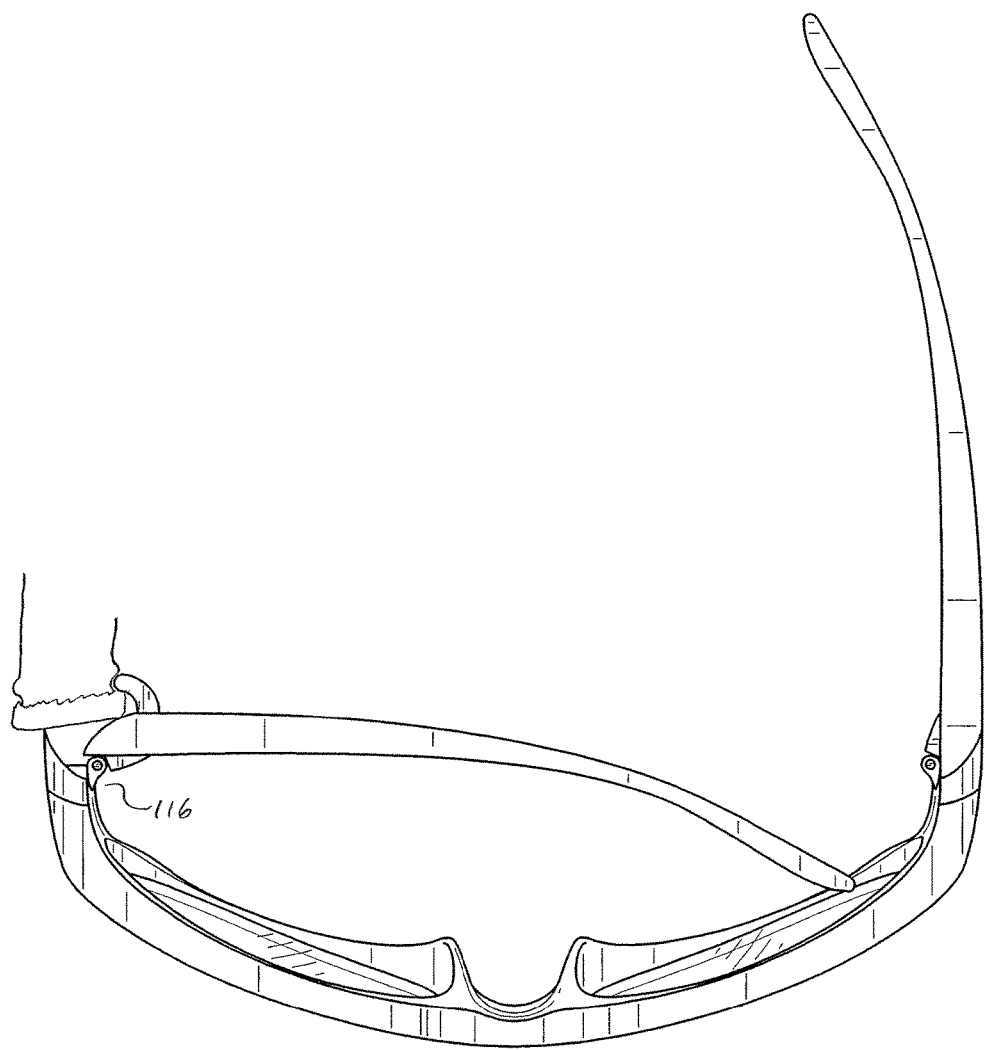
FIG. 9 is a bottom view showing a temple folded according to certain embodiments.

FIGS. 1-9 illustrate embodiments of eyeglasses with integrated bottle openers that include retractable tabs. According to certain embodiments, eyeglasses 100 may include frame 102, first temple 106, second temple 108, tab 110, brace 112, and hinges 114. FIG. 9 is a bottom view of an embodiment of eyeglasses 100 illustrating eyeglasses 100 in the bottle opening mode. Temple 106 is folded inwardly against frame 102. Tab 110 is extended outwardly from temple 106. A user positions tab 110 underneath the lip of a bottle cap with the top of the bottle cap resting against brace 112. With respect to the view illustrated in FIG. 9, a clockwise motion of eyeglasses 100 pries the bottle cap off of the bottle.

Figure 1:
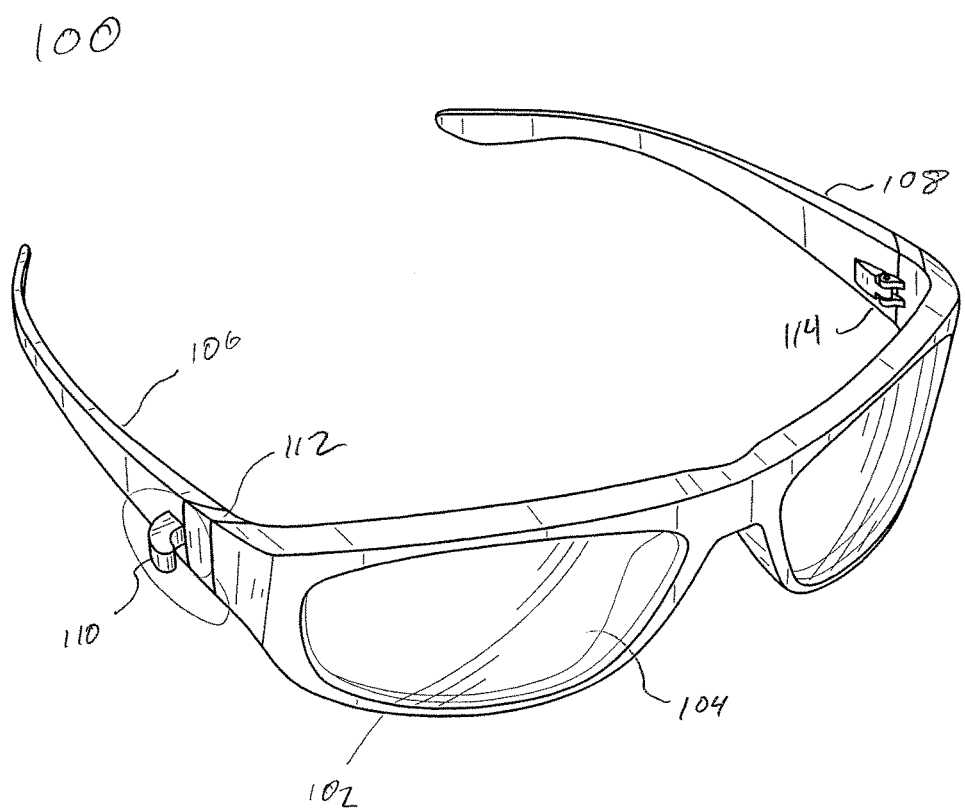
FIG. 1 is a perspective view showing the bottle opener extended according to certain embodiments.
Figure 6:
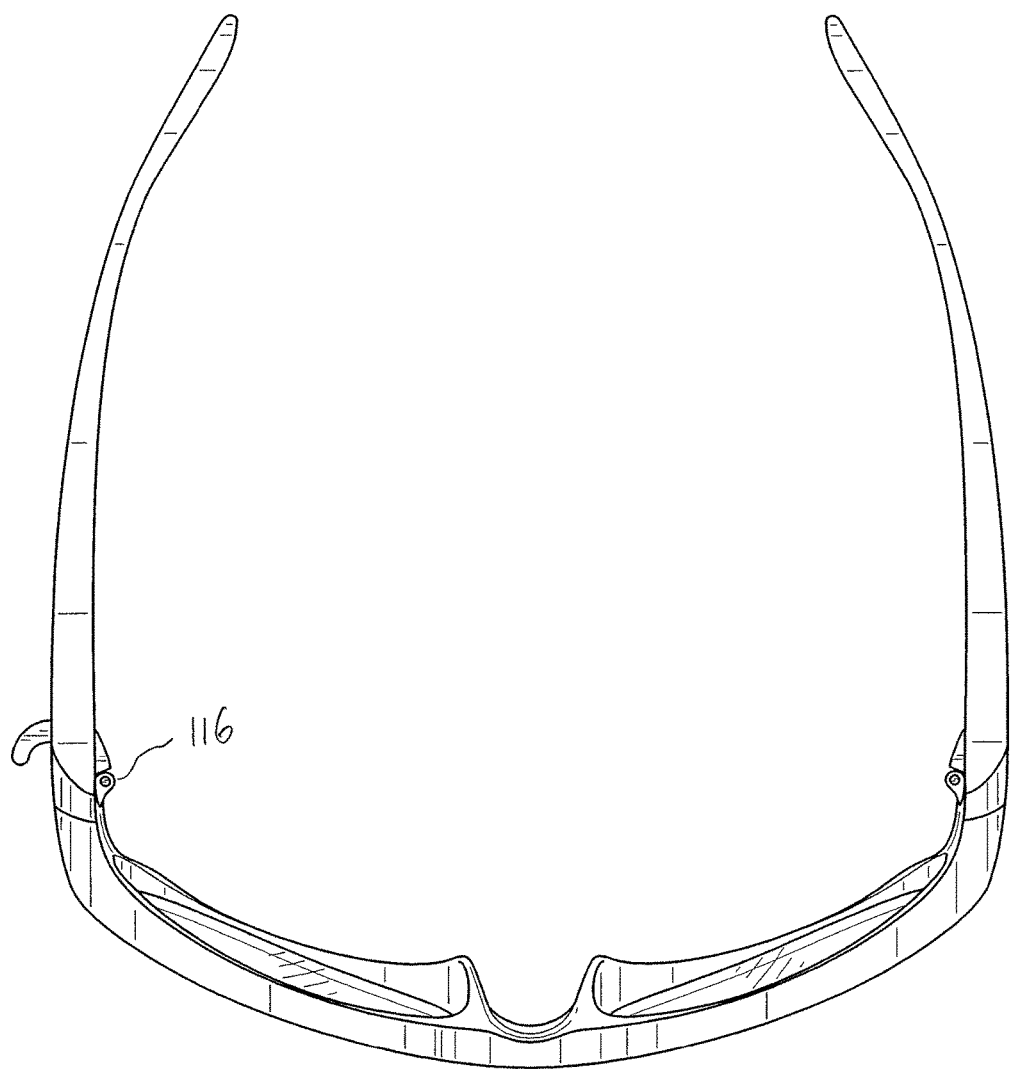
FIG. 6 is a top view showing the bottle opener extended according to certain embodiments.

Referring to FIG. 1, according to certain embodiments, frame 102 includes lenses 104. Lenses 104 may be prescription lenses, shaded lenses, lenses with UV protection, any combination of these, or any other type of lenses. Lenses 104 may be removable or may be permanently affixed in frame 102. Attached to frame 102 are temples 106 and 108 that extend in a rearward direction from the back of frame 102 to rest on top of a wearer's ears in the manner of conventional eyeglasses. Temples 106 and 108 are attached to frame 102 with hinge 114 and hinge 116 (as shown in FIGS. 6, 7, and 9) that enable hinges 106 and 108 to be folded against frame 102 when not worn by a user.

As described above, tab 110 and brace 112 may be the components of eyeglasses 100 that apply the prying force to a bottle cap during opening of a bottle. According to certain embodiments, tab 110 and brace 112 are built into one side of eyeglasses 100. According to other embodiments, one or both of tab 110 and brace 112 are built into both side of eyeglasses 100. As shown in FIG. 1, brace 112 is affixed to the back of frame 102 on the right side of frame 102. According to certain embodiments, brace 112 is affixed to both the left and right side of frame 102 for a uniform look even where tab 110 is included only on one side. For example, in the embodiments illustrated in FIGS. 1-9, brace 112 is affixed to both the left and right sides of frame 102. Brace 112 projects in a rearward direction from the back of frame 112. According to certain embodiments, frame 112 includes a portion that projects from the back of frame 102, and brace 112 is affixed to this projection. For example, brace 112 may be configured as a sleeve to slide over the projection. According to certain embodiments, brace 112 is rigidly affixed to frame 102. For example, brace 112 may be screwed into frame 102, glued to frame 102, sintered onto frame 102, or welded onto frame 102. Brace 112 may be configured to provide a smooth transition from frame 102 to temple 106 such that the outside, inside, top and bottom surfaces of frame 102, brace 112, and temple 106 are substantially continuous (i.e., there are no steps, gaps, or other discontinuities at the joints) when temple 106 is folded outwardly in the wearing position.

Temple 106 and tab 110 are attached to frame 102 with hinge 116. Temple 106 and tab 110 may rotate about hinge 116 independently of each other. Temple 106 includes a cutout in the end that attaches to hinge 116. The cutout accommodates tab 110, allowing tab 110 to extend and retract through the cutout. The cutout may be a notch or hole. By notch, it is meant that the cutout has three sides with the fourth side being the end of temple 106. By hole, it is meant a cutout whose perimeter is formed of temple 106. For example, the hole may be substantially rectangular with each side of the rectangle comprising temple 106. According to certain embodiments, the cutout in temple 106 is large enough to provide clearance between tab 110 and the cutout.

Tab 110 moves through the cutout in temple 106. Tab 110 may have a rectangular cross section that is sized for a certain predetermined clearance between tab 110 and the cutout in temple 106. According to certain embodiments, the size of the cross section may be constant throughout the portion of tab 110 that is configured to move through the cutout in temple 106. FIGS. 1-7 illustrate embodiments with tab 110 fully rotated outwardly from frame 102 through the cutout in temple 106. FIGS. 8 and 9 illustrate tab 110 fully rotated inwardly toward frame 102. FIG. 8 illustrates that tab 110 may be rotated inwardly toward frame 102 such that tab 110 is retracted into temple 106. According to certain embodiments, the cutout in temple 106 is sized such that when tab 110 is retracted into temple 106, the cutout is filled in by the end of tab 110. For example, the end of tab 110 may have a rectangular shape that matches the shape of the cutout in temple 106 with a certain amount of clearance. This could enable tab 110 to be inconspicuous or substantially hidden when retracted. In certain embodiments, the end of tab 110 is flush with the outer side of temple 106 when tab 110 is retracted into temple 106, also enabling tab 110 to be inconspicuous or substantially hidden when retracted. According to certain embodiments, the cutout in temple 106 is a hole and the side of the hole nearest the hinge attachment point serves as a stop for tab 110. This help to limit the travel of tab 110 so that it does not extend from temple 106 beyond the point necessary to engage with a bottle cap.

According to certain embodiments, the profile of the side surface of tab 110 opposite the side that engages a bottle cap is shaped such that a predetermined clearance is maintained between the corresponding cutout wall in temple 106 and that side of tab 110. For example, as shown in FIG. 6, the side surface of tab 110 that faces in a rearward direction (away from the front of eyeglasses 100) has a curved configuration that may be designed to maintain a constant clearance with the corresponding wall of the cutout in temple 106.

According to certain embodiments, eyeglasses 100 are configured such that when tab 110 is fully rotated inwardly, the end of tab 110 furthest from the hinge attachment point is flush with the outer side surface of temple 106 when temple 106 is in its extended position (e.g., when worn by a wearer). According to certain embodiments, eyeglasses 100 are configured so that when temple 106 is fully folded into frame 102, tab 110 is full extended from temple 106. According to certain embodiments, when temple 106 is fully folded into frame 102 and tab 110 is fully rotated inwardly toward frame 102, tab 110 is fully extended from temple 106.

Tab 110 is configured to extend from temple 106 such that the lip of a bottle cap (the portion extending outward from the bottle) may fit between tab 110 and the side of temple 106. According to certain embodiments, when tab 110 is engaged with a bottle cap prior to prying the bottle cap from a bottle, a clearance is maintained between the top corner of the bottle cap and the temple 106. While in certain other embodiments, the top corner of the bottle cap and temple 106 come into contact.

According to certain embodiments, hinge 116 is rigidly attached to the rear of frame 102. According to certain embodiments, hinge 116 is rigidly attached to a portion of frame 102 that projects in a rearward direction. According to certain embodiments, hinge 116 is rigidly attached to brace 112.

Figure 2:
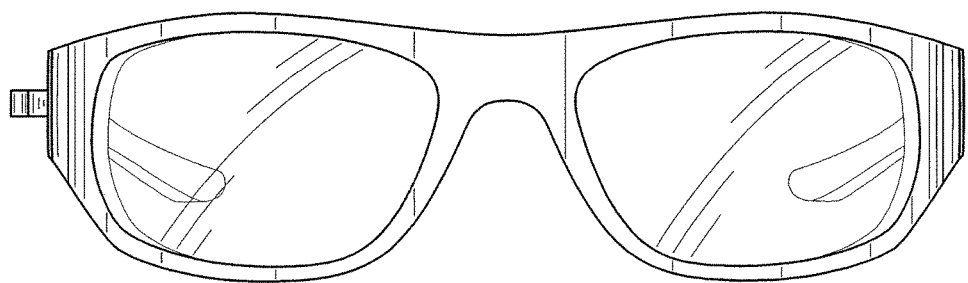
FIG. 2 is a front view showing the bottle opener extended according to certain embodiments.
Figure 3:
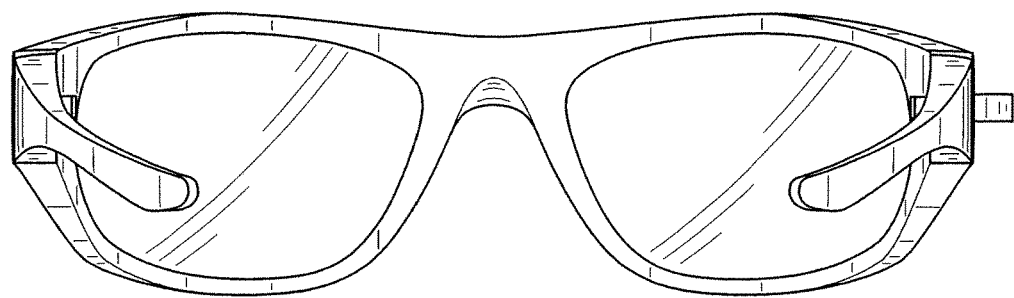
FIG. 3 is a rear view showing the bottle opener extended according to certain embodiments.
Figure 4:
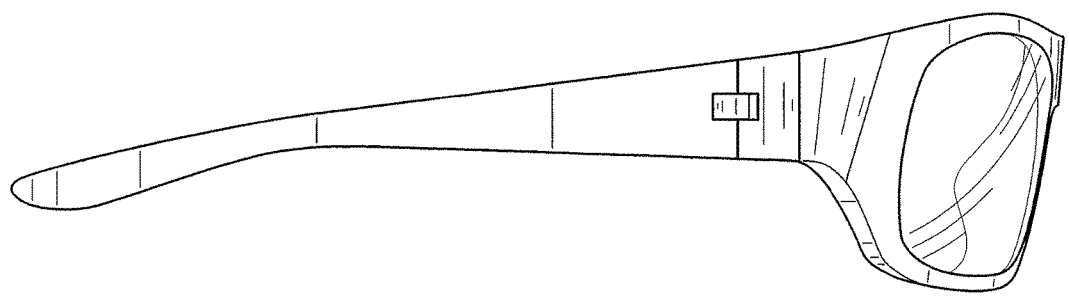
FIG. 4 is a first side view showing the bottle opener extended according to certain embodiments.
Figure 5:
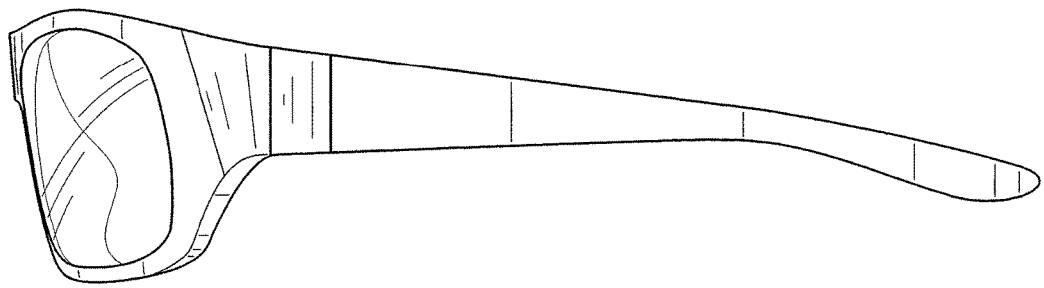
FIG. 5 is a second side view according to certain embodiments.

FIG. 2 is a front view of eyeglasses 102, according to one embodiment, showing tab 110 rotated outwardly from frame 102 and extended past temple 106. FIG. 3 is a rear view of this same configuration. FIG. 4 is a right side view of this embodiment showing tab 110. FIG. 5 is a left side view of this embodiment showing no tab 110.

FIGS. 6 and 7 are bottom and top views, respectively, of one embodiment in which tab 110 is on the left side of eyeglasses 100. In these views, tab 110 is rotated outwardly from frame 102, extending beyond temple 106. FIG. 9 is a bottom view of one embodiment in which tab 110 is on the left side of eyeglasses 100 and the eyeglasses are in the bottle opening mode. In this view, tab 110 is fully rotated inwardly toward frame 102 and temple 106 is folded toward frame 102.

Figure 15:
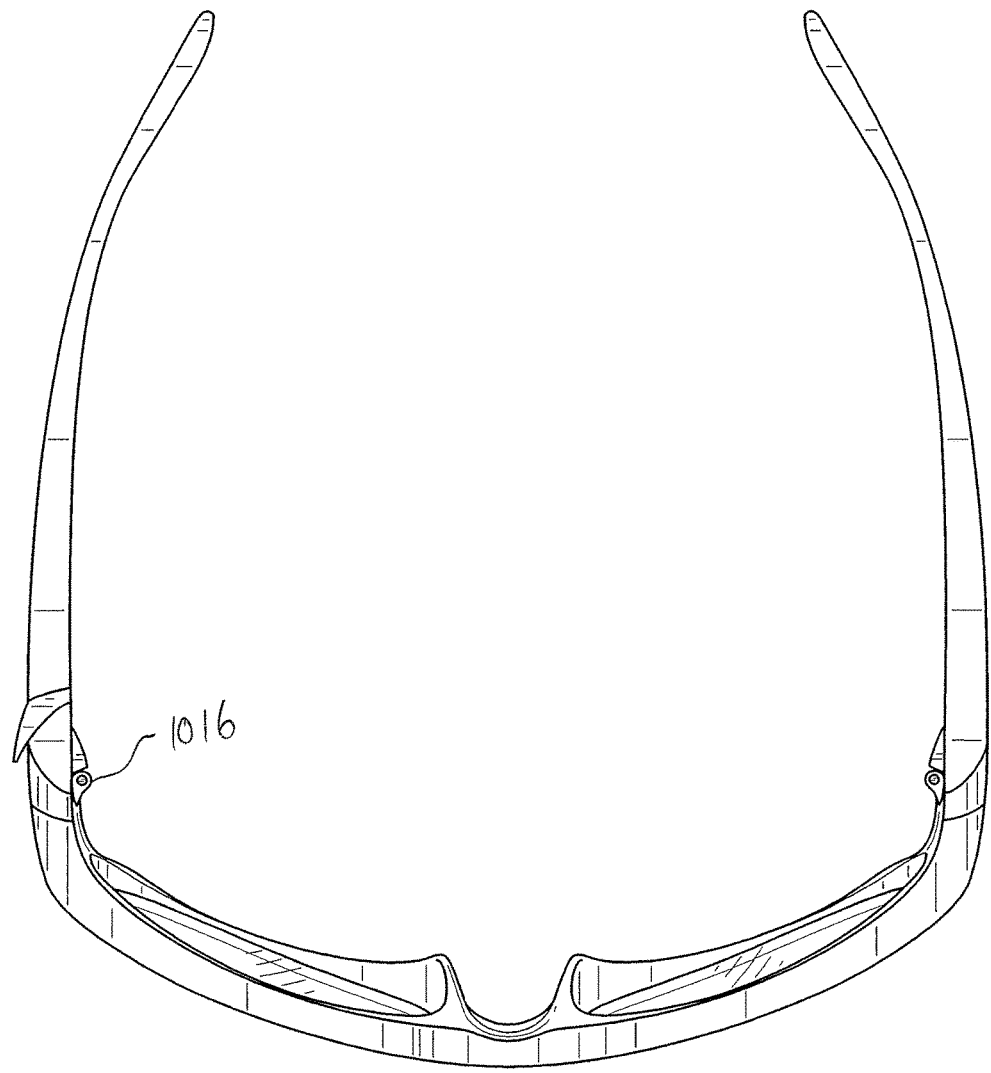
FIG. 15 is a bottom view showing the bottle opener fixed to a temple according to certain embodiments.
Figure 16:
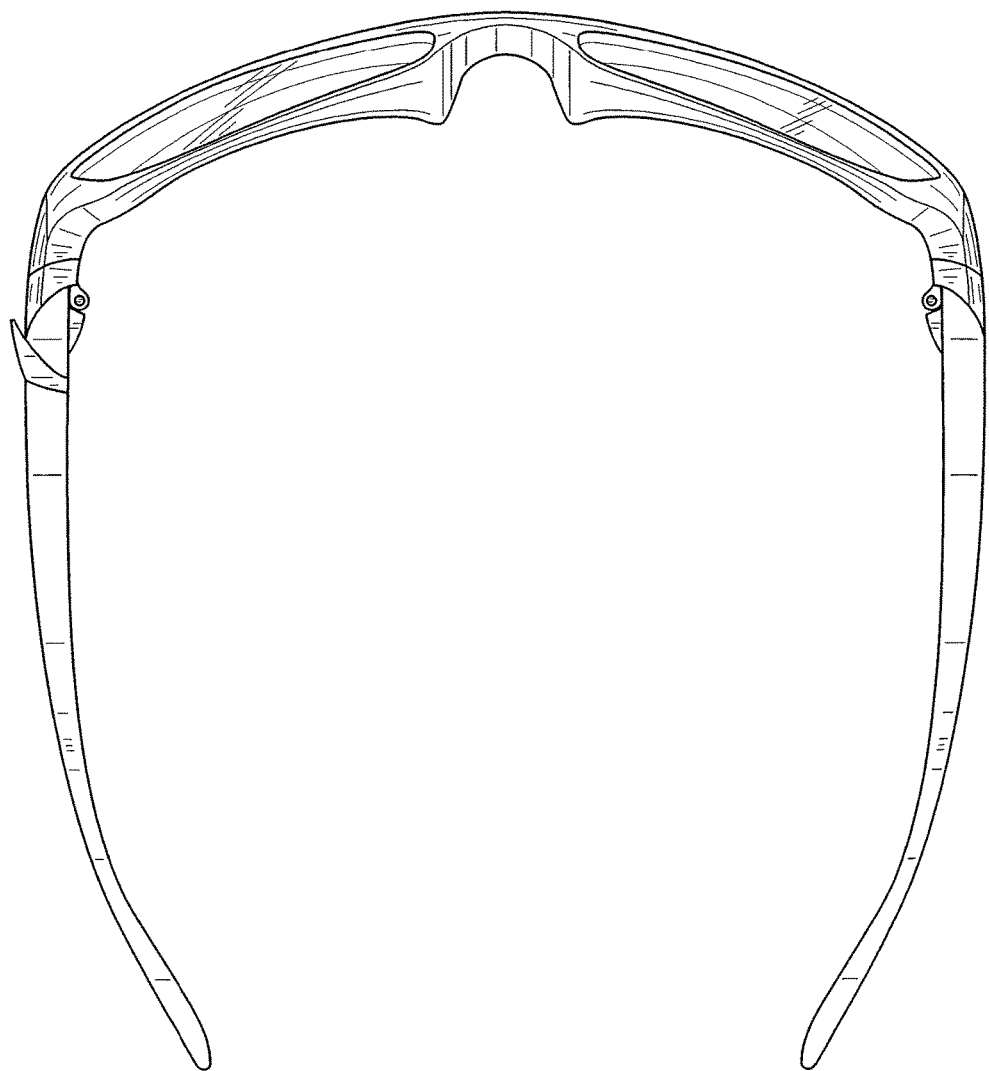
FIG. 16 is a top view showing the bottle opener fixed to a temple according to certain embodiments.
Figure 17:
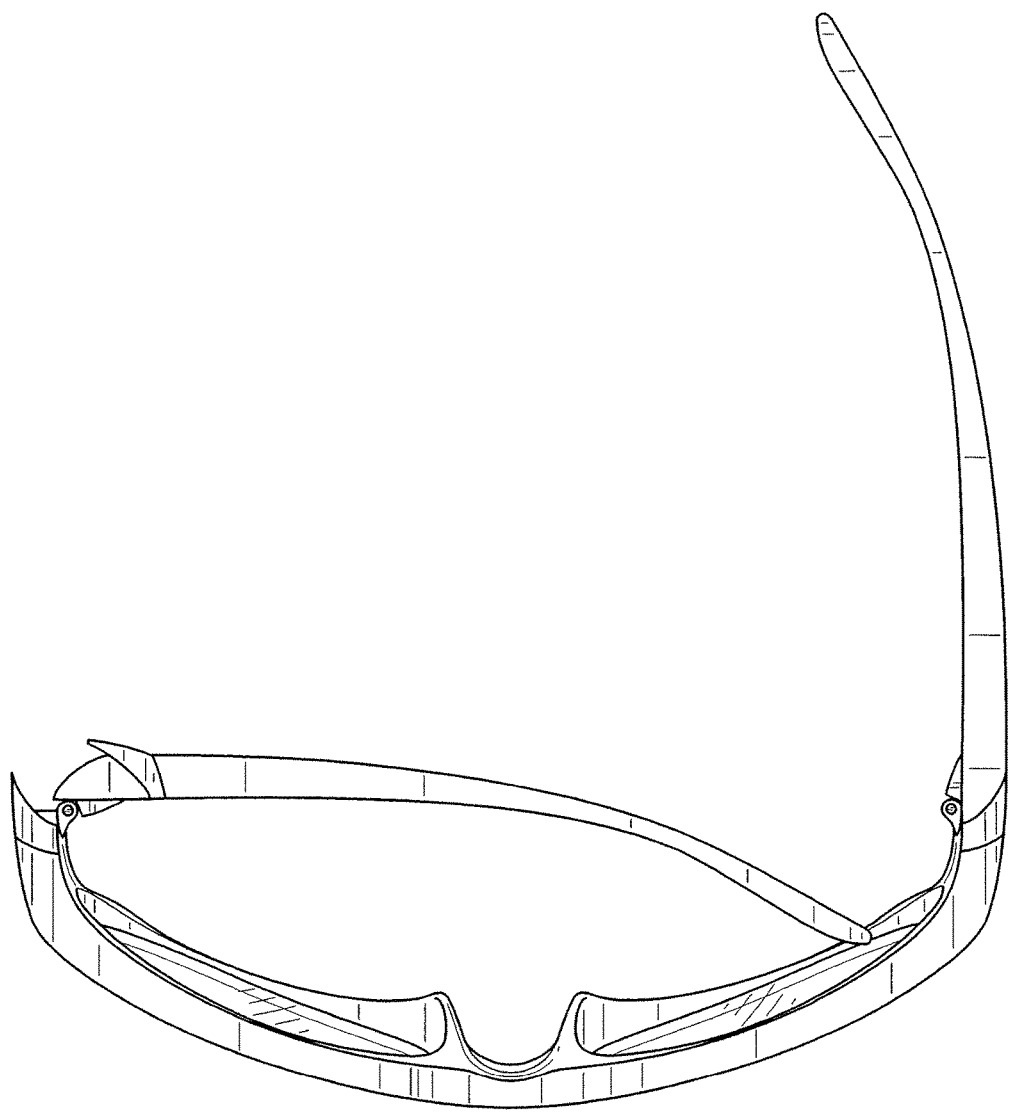
FIG. 17 is a bottom view showing a temple folded according to certain embodiments.

FIGS. 10-17 illustrate embodiments of eyeglasses with integrated bottle openers that are fixed to the temple. According to certain embodiments, eyeglasses 1000 may include frame 1002, first temple 1006, second temple 1008, tab 1010, brace 1012, and hinge 1014. FIG. 17 is a bottom view of an embodiment of eyeglasses 1000 illustrating eyeglasses 1000 in the bottle opening mode. Temple 1006 is folded inwardly against frame 1002. Tab 1010 is projects outwardly from temple 1006. A user positions tab 1010 underneath the lip of a bottle cap with the top of the bottle cap resting against brace 1012. With respect to the view illustrated in FIG. 9, a clockwise motion of eyeglasses 1000 pries the bottle cap off of the bottle.

Figure 10:
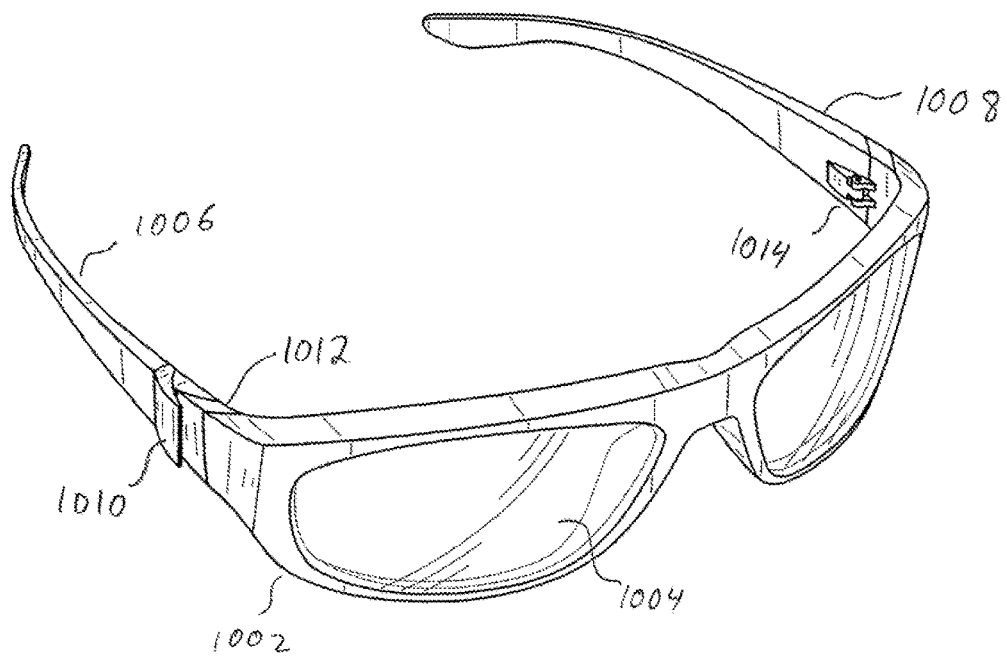
FIG. 10 is a perspective view showing the bottle opener fixed to a temple according to certain embodiments.

Referring to FIG. 10, according to certain embodiments, frame 1002 includes lenses 1004. Lenses 1004 may be prescription lenses, shaded lenses, lenses with UV protection, any combination of these, or any other type of lenses. Lenses 1004 may be removable or may be permanently affixed in frame 1002. Attached to frame 1002 are temples 1006 and 1008 that extend in a rearward direction from the back of frame 1002 to rest on top of a wearer's ears in the manner of conventional eyeglasses. Temples 1006 and 1008 are attached to frame 1002 with hinge 1014 and hinge 1016 (shown in FIGS. 15-17) that enable hinges 1006 and 1008 to be folded toward frame 1002 when not worn by a user.

As described above, tab 1010 and brace 1012 may be the components of eyeglasses 1000 that apply the prying force to a bottle cap during opening of a bottle. According to certain embodiments, tab 1010 and brace 1012 are built into one side of eyeglasses 1000. According to other embodiments, one or both of tab 1010 and brace 1012 are built into both side of eyeglasses 100. As shown in FIG. 10, brace 1012 is affixed to the back of frame 1002 on the right side of frame 1002. According to certain embodiments, brace 1012 is affixed to both the left and right side of frame 1002 for a uniform look even where tab 1010 is included only on one side. For example, in the embodiments illustrated in FIGS. 10-17, brace 1012 is affixed to both the left and right sides of frame 1002. Brace 1012 projects in a rearward direction from the back of frame 1012. According to certain embodiments, frame 1012 includes a portion that projects from the back of frame 1002, and brace 1012 is affixed to this projecting portion. For example, brace 1012 may be configured as a sleeve to slide over the projecting portion. According to certain embodiments, brace 1012 is rigidly affixed to frame 1002. For example, brace 1012 may be screwed into frame 1002, glued to frame 1002, sintered onto frame 1002, or welded onto frame 1002. Brace 112 may be configured to provide a smooth transition from frame 1002 to temple 1006 such that the outside, inside, top and bottom surfaces of frame 1002, brace 1012, and temple 1006 are substantially continuous (i.e., there are no substantial steps, gaps, or other discontinuities at the mating joints) when temple 1006 is folded outwardly in the wearing position.

Temple 1006 is attached to frame 1002 with hinge 1016. Hinge 1016 may be affixed directly to frame 1002 or it may be affixed to brace 1012. Tab 1010 is rigidly attached to temple 1006. According to certain embodiments, tab 1010 is a separate piece from temple 1006 and is rigidly attached to temple 1006, for example, by gluing, sintering, pinning, welding, or screwing. According to certain embodiments, tab 1010 is pinned or otherwise attached to temple 1006 such that tab 1010 may rotate relative to temple 1006.

Tab 1010 is configured to extend from temple 1006 such that the lip of a bottle cap (the portion extending outwardly from the bottle) may fit between tab 1010 and the side of temple 1006. According to certain embodiments, when tab 1010 is engaged with a bottle cap prior to prying the bottle cap from a bottle, a clearance is maintained between the top corner of the bottle cap and the temple 1006, whereas in certain other embodiments, the top corner of the bottle cap and temple 1006 come into contact.

Figure 11:
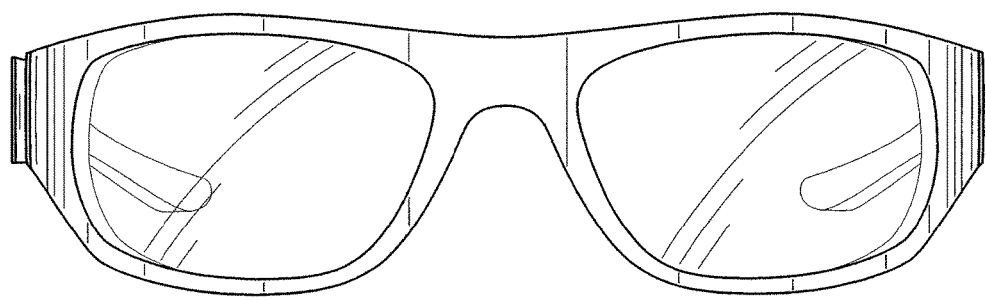
FIG. 11 is a front view showing the bottle opener fixed to a temple according to certain embodiments.
Figure 12:
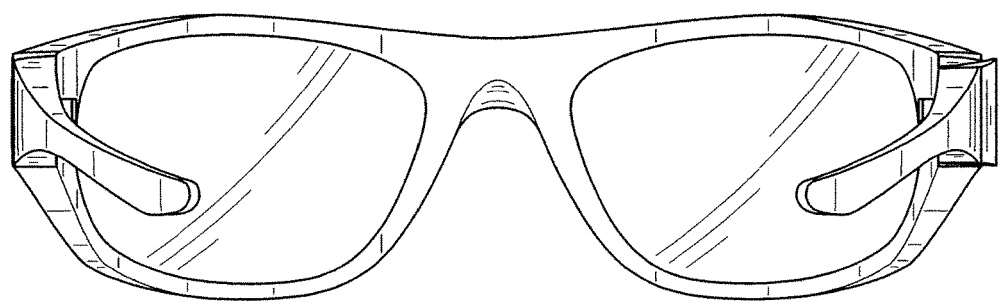
FIG. 12 is a rear view showing the bottle opener fixed to a temple according to certain embodiments.
Figure 13:
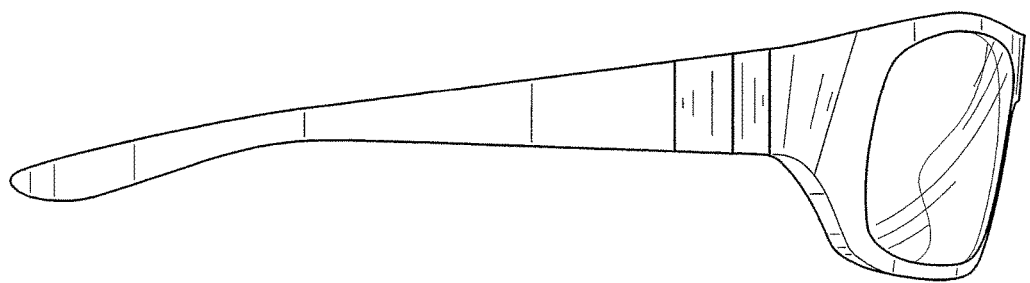
FIG. 13 is a first side view showing the bottle opener fixed to a temple according to certain embodiments.
Figure 14:
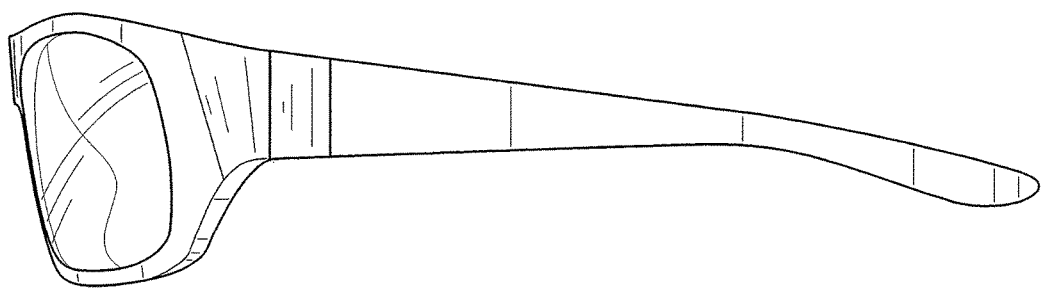
FIG. 14 is a second side view according to certain embodiments.

FIG. 11 is a front view of eyeglasses 102, according to one embodiment, showing tab 1010 extending beyond the side of temple 106. FIG. 12 is a rear view of this same configuration. FIG. 13 is a right side view of this embodiment showing tab 1010. FIG. 14 is a left side view of this embodiment showing no tab 1010.

FIGS. 15 and 16 are bottom and top views, respectively, of one embodiment in which tab 1010 is on the left side of eyeglasses 1000. FIG. 9 is a bottom view of one embodiment, in which tab 110 is on the left side of eyeglasses 1000, showing eyeglasses 1000 in the bottle opening mode. In this view, temple 1006 is folded toward frame 1002.

Described herein are embodiments of eyeglasses with bottle opening features integrated into the frame. According to certain embodiments, the bottle opening features may be inconspicuously integrated into the frame and the bottle opening functionality of the eyeglasses may be easy to use. The described embodiments allow a user to always have a bottle opener handy whenever they have their eyeglasses.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new and desired to be protected by Letters Patent of the United States is:

1. An eyeglass frame comprising:
    a center portion configured to hold two lenses;
    a temple member connected to the center portion with a hinge;
    a tab connected to the temple member configured to fit underneath the lip of a bottle cap and remove the bottle cap; and
    wherein the center portion comprises a brace extending from the back of the center portion and configured to contact the top of the bottle cap while the tab fits underneath the lip of the bottle cap.

2. The eyeglass frame of claim 1, wherein the tab comprises a protruding portion protruding from a side of the temple member, the protruding portion including an extension that extends toward an end of the temple member connected to the center portion such that a gap is formed between the extension and the side of the temple member.

3. The eyeglass frame of claim 1, wherein the tab is rigidly connected to the temple member.

4. The eyeglass frame of claim 1, wherein the tab is connected to the temple member by the hinge and is configured to extend through the temple member when in use.

5. The eyeglass frame of claim 1, wherein the center portion and the temple member are formed of plastic and the tab and the brace are formed of metal.

6. The eyeglass frame of claim 1, further comprising a brace connected to the temple member, the brace configured to contact the top of the bottle cap while the tab fits underneath the lip of the bottle cap.

7. The eyeglass frame of claim 1, wherein the temple member comprises a slot into which the tab recesses when not in use.

8. The eyeglass frame of claim 1, wherein the tab extends outward from a side of the temple member opposite the hinge.

9. The eyeglass frame of claim 1, wherein the temple member fully folds into the center portion via the hinge, and wherein the tab is extended from the temple member while the temple member is fully folded.

10. The eyeglass frame of claim 9, wherein the brace is configured to contact the top of the bottle cap while the temple member is fully folded.

\* \* \* \* \*